United States Patent
Farooq et al.

(10) Patent No.: US 9,789,840 B2
(45) Date of Patent: Oct. 17, 2017

(54) DOWNWARDLY INFLATABLE VEHICLE AIRBAG

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/074,465

(22) Filed: Mar. 18, 2016

(65) Prior Publication Data

US 2017/0267204 A1    Sep. 21, 2017

(51) Int. Cl.
*B60R 21/214* (2011.01)
*B60R 21/231* (2011.01)
*B60N 2/14* (2006.01)

(52) U.S. Cl.
CPC .............. *B60R 21/231* (2013.01); *B60N 2/14* (2013.01); *B60R 21/214* (2013.01); *B60R 2021/23161* (2013.01)

(58) Field of Classification Search
CPC combination set(s) only.
See application file for complete search history.

(56) References Cited

U.S. PATENT DOCUMENTS

| | | | |
|---|---|---|---|
| 3,510,150 A * | 5/1970 | Wilfert | B60R 21/16 280/730.1 |
| 3,618,979 A * | 11/1971 | Gulette | B60R 21/231 280/731 |
| 3,623,768 A | 11/1971 | Capener | |
| 3,795,412 A * | 3/1974 | John | B60R 21/08 180/274 |
| 3,897,961 A * | 8/1975 | Leising | B60R 21/214 280/730.1 |
| 3,953,049 A * | 4/1976 | Surace | B60R 21/08 280/730.1 |
| 4,227,717 A | 10/1980 | Bouvier | |
| 4,508,294 A | 4/1985 | Lorch | |
| 5,470,103 A * | 11/1995 | Vaillancourt | B60R 21/214 280/730.1 |

(Continued)

FOREIGN PATENT DOCUMENTS

| | | |
|---|---|---|
| DE | 2008030380 A1 | 1/2009 |
| FR | 2667831 A1 | 4/1992 |

(Continued)

OTHER PUBLICATIONS

Non-Final Office Action dated Mar. 22, 2017; U.S. Appl. No. 15/085137; 24 pages.

(Continued)

*Primary Examiner* — Nicole Verley
(74) *Attorney, Agent, or Firm* — Frank MacKenzie; Bejin Bieneman PLC

(57) ABSTRACT

A vehicle interior includes a roof, a seat including a seatback, and an airbag supported by the roof. The airbag is inflatable away from the roof to an inflated position surrounding the seatback. During an impact of the vehicle, the airbag may be inflated from an uninflated position to the inflated position to absorb energy from an occupant of the vehicle.

18 Claims, 8 Drawing Sheets

(56) References Cited

U.S. PATENT DOCUMENTS

| | | | |
|---|---|---|---|
| 5,507,519 A | 4/1996 | Schettler-Kohler | |
| 5,568,902 A | 10/1996 | Hurley | |
| 5,575,497 A | 11/1996 | Suyama et al. | |
| 6,142,521 A | 11/2000 | Shephard | |
| 6,513,829 B1* | 2/2003 | Zumpano | B60N 2/286 280/730.1 |
| 6,966,576 B1 | 11/2005 | Greenstein | |
| 7,331,600 B2 | 2/2008 | Miyata | |
| 7,523,956 B2* | 4/2009 | Zumpano | B60N 2/286 280/730.1 |
| 8,087,690 B2* | 1/2012 | Kim | B60R 21/214 280/729 |
| 8,882,138 B1 | 11/2014 | Hicken et al. | |
| 9,272,680 B1 | 3/2016 | Mirzazadeh | |
| 9,321,423 B2 | 4/2016 | Jaradi et al. | |
| 9,446,731 B1 | 9/2016 | West et al. | |
| 9,533,651 B1* | 1/2017 | Ohno | B60R 21/23138 |
| 2004/0160039 A1* | 8/2004 | Heist | B60R 21/203 280/728.2 |
| 2006/0192367 A1* | 8/2006 | Zumpano | B60N 2/286 280/730.1 |
| 2013/0015642 A1* | 1/2013 | Islam | B60R 21/207 280/730.1 |
| 2013/0087995 A1* | 4/2013 | Lee | B60R 21/214 280/728.2 |
| 2014/0217796 A1 | 8/2014 | Haller | |
| 2015/0167233 A1 | 6/2015 | Hwang et al. | |
| 2015/0258954 A1 | 9/2015 | Engelman et al. | |
| 2015/0274114 A1 | 10/2015 | Nagasawa et al. | |
| 2016/0052636 A1 | 2/2016 | Moeller et al. | |
| 2016/0121839 A1* | 5/2016 | Ko | B60R 21/233 280/730.1 |
| 2016/0264021 A1* | 9/2016 | Gillett | B60K 1/04 |

FOREIGN PATENT DOCUMENTS

| | | |
|---|---|---|
| FR | 2724350 | 9/1994 |
| JP | H05208647 A | 8/1993 |
| KR | 100993032 B1 | 11/2010 |
| WO | 00/50271 A1 | 8/2000 |

OTHER PUBLICATIONS

UKIPO Search Report dated Aug. 30, 2017 for GB1704381.1 (4 pages).

* cited by examiner

DOWNWARDLY INFLATABLE VEHICLE AIRBAG

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities. There remains an opportunity to design vehicle amenities for the occupants that takes into account the reduced operation monitoring provided by the autonomous vehicle.

DETAILED DESCRIPTION

Figure 1:
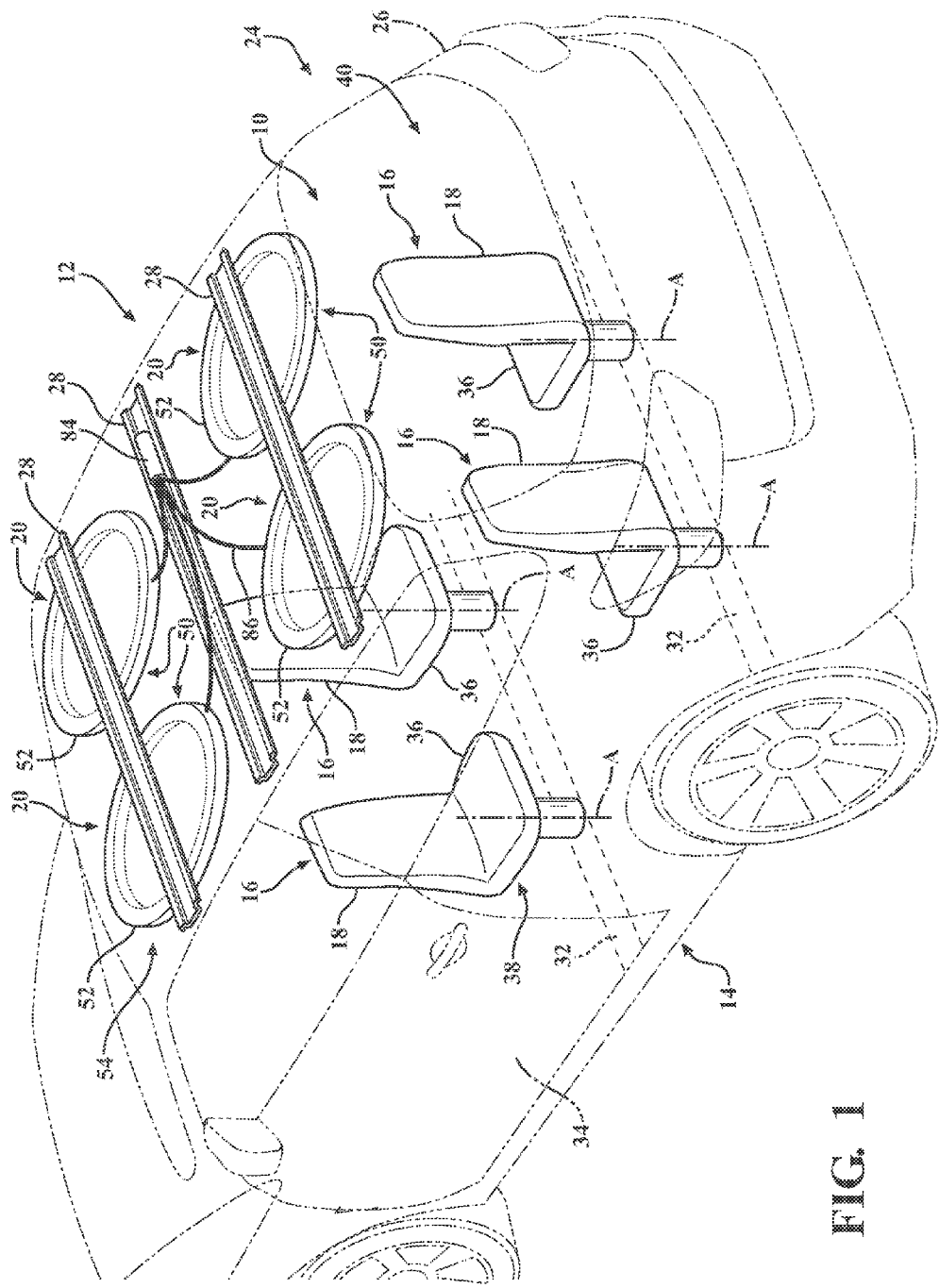
FIG. 1 is a perspective view of a vehicle including a plurality of airbags in an uninflated position and an inflator supported by a roof of the vehicle.

With reference to the Figures, wherein like numerals indicate like parts throughout the several views, a vehicle interior 10 for a vehicle 24 includes a roof 12, a floor 14, a seat 16 including a seatback 18, and an airbag 20 supported by the roof 12. The airbag 20 is inflatable away from the roof 12 to an inflated position surrounding the seatback 18. The seat 16 may be rotatable relative to the floor 14 about an axis A transverse to the floor 14.

Figure 3:
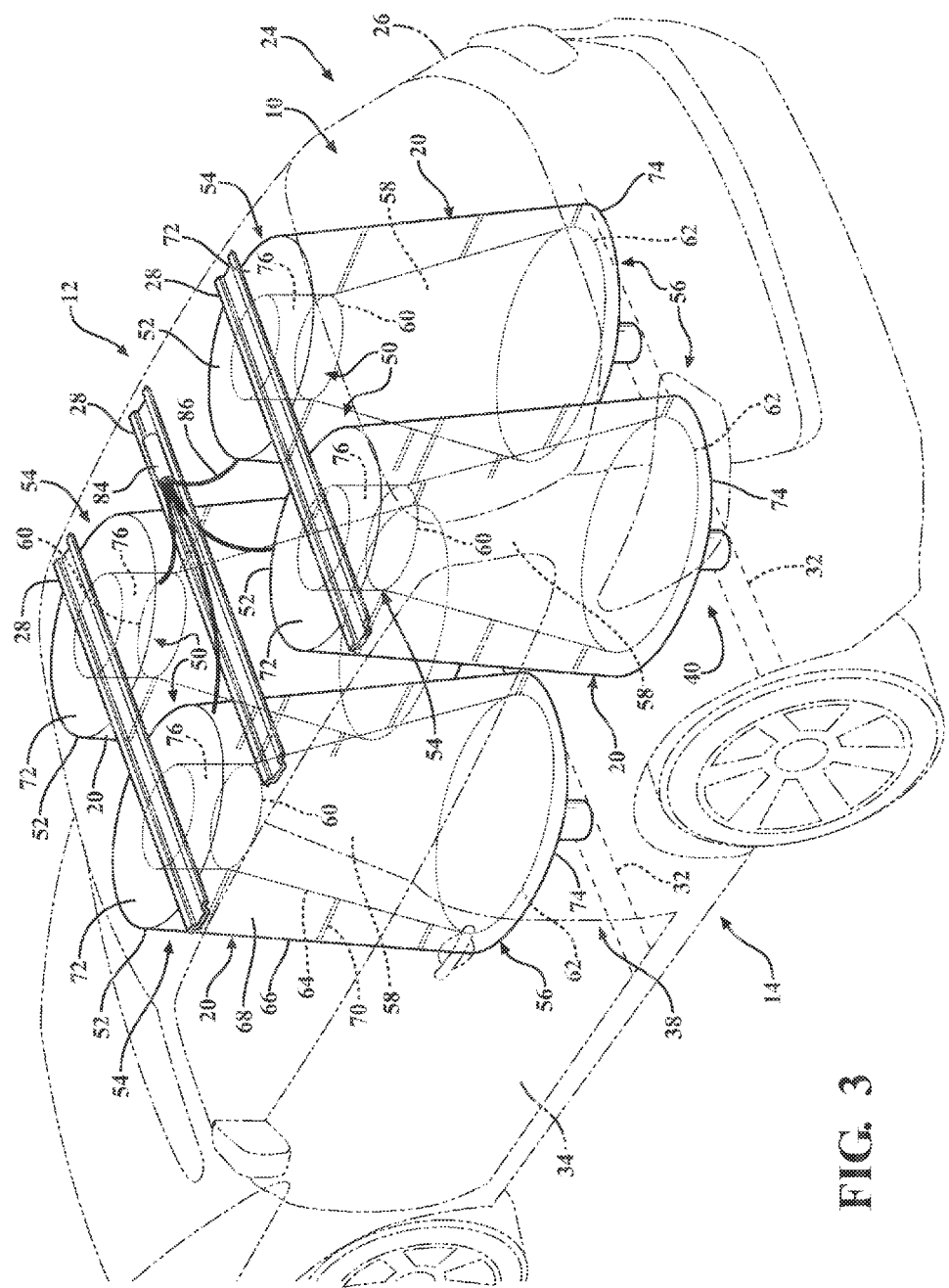
FIG. 3 is the perspective view of the vehicle including another embodiment of the airbag.
Figure 4:
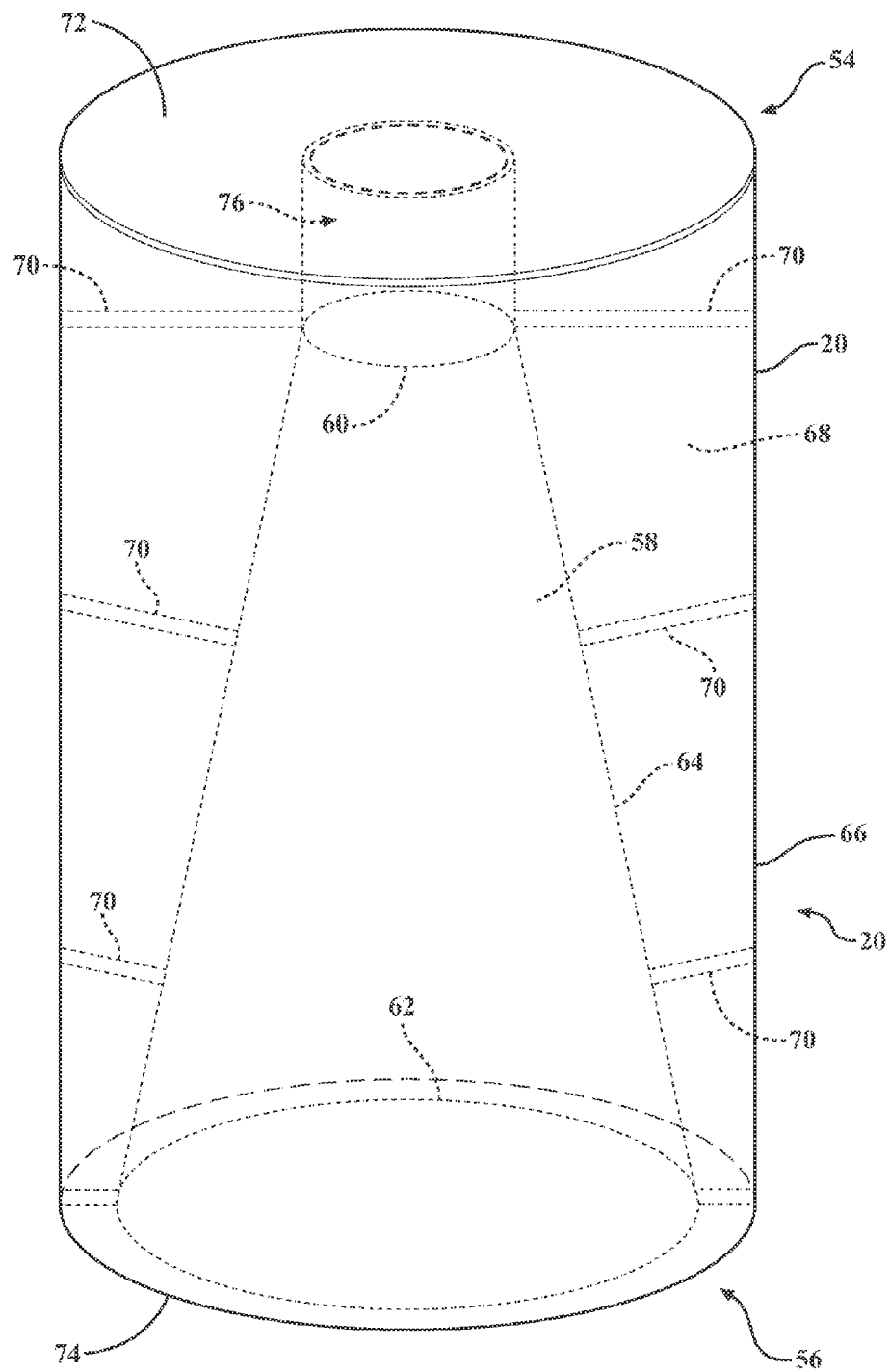
FIG. 4 is the perspective view one of the airbags of FIG. 3.
Figure 5:
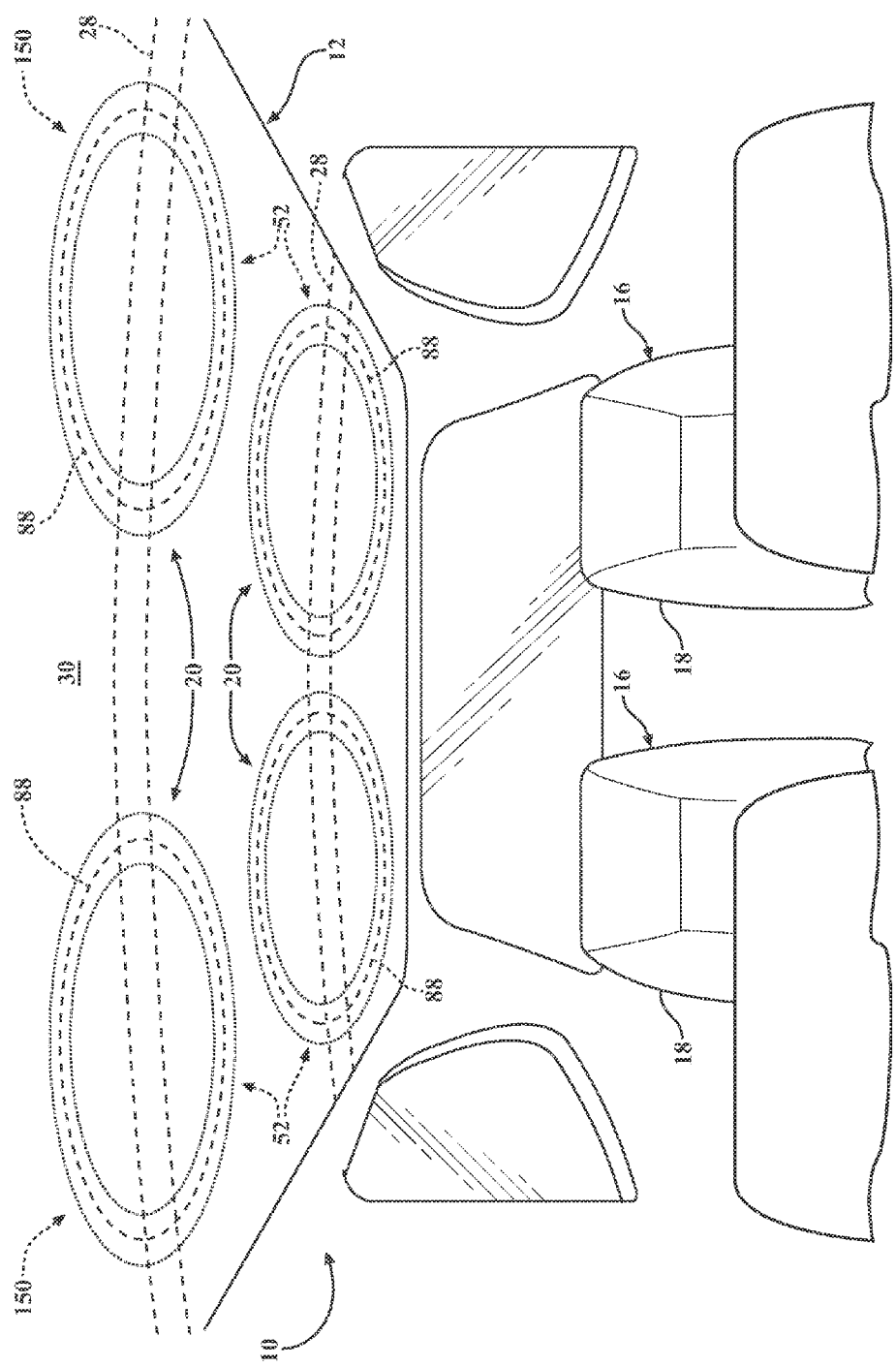
FIG. 5 is the perspective view of an interior of the vehicle with tear seams defined in a headliner on the roof.
Figure 6:
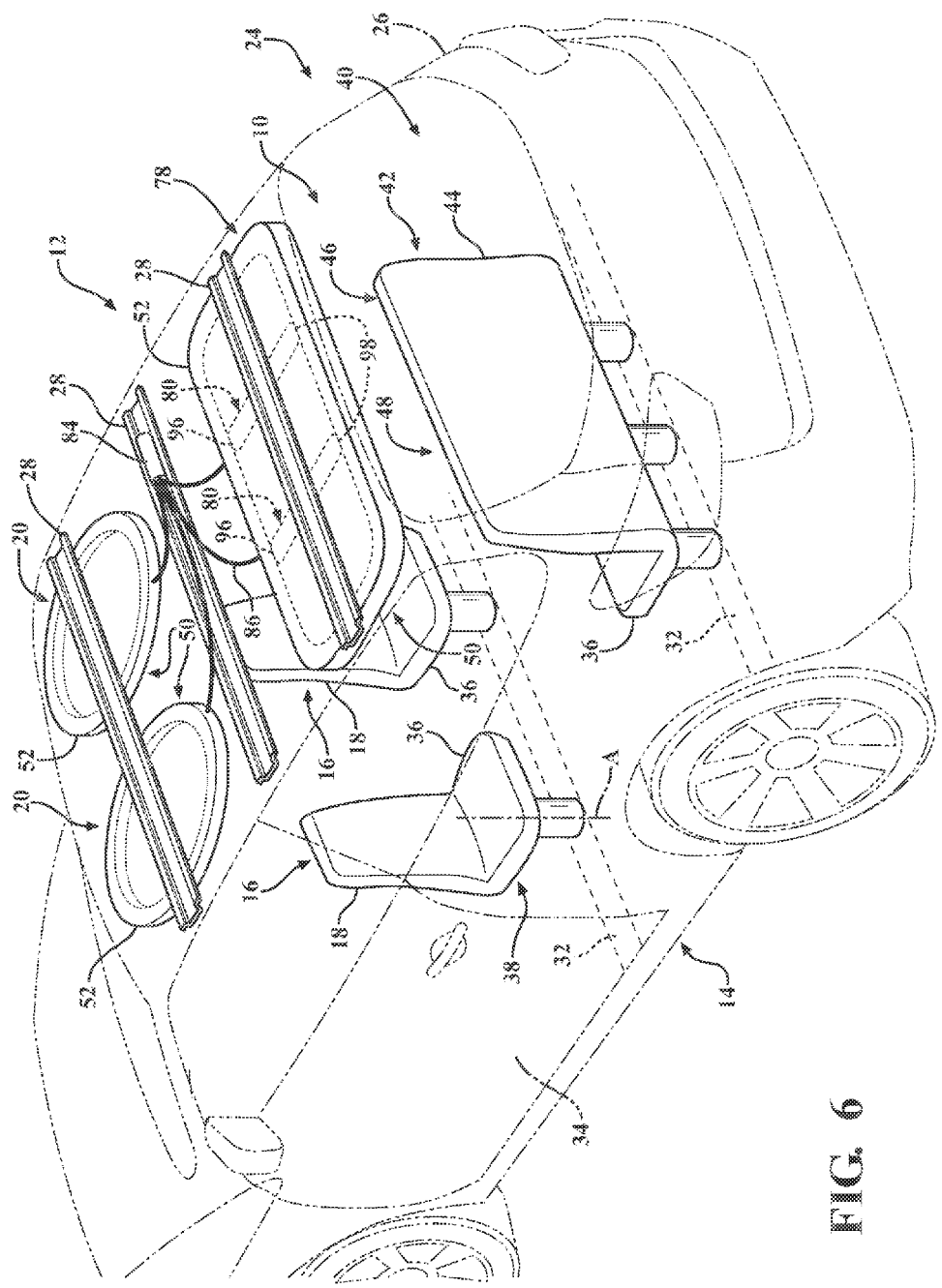
FIG. 6 is the perspective view of the vehicle with a second seat having a first passenger portion and a second passenger portion and airbags in the uninflated position.

As set forth further below, the airbag 20 may inflate from an uninflated position, as shown in FIGS. 1, 5, and 6, to the inflated position, as shown in FIGS. 2-4 and 7. The inflation of the airbag 20 may occur in response to a vehicle impact. The airbag 20 in the inflated position may absorb energy during the vehicle impact from an occupant 22, and thereby the airbag 20 in the inflated position may reduce a likelihood of the occupant 22 impacting other occupants 22 and/or components of the vehicle interior 10.

The vehicle 24, for example, may be an autonomous vehicle. In other words, the vehicle 24 may be autonomously operated such that the vehicle 24 may be driven without constant attention from a driver (not numbered), i.e., the vehicle 24 may be self-driving without human input. During the operation of the autonomous vehicle the occupants 22 may face one another. As set forth below, the seats 16 may be rotatable relative to the floor 14 to face each other. The airbag 20 in the inflated position may reduce the likelihood of the occupants 22 impacting one another. For example, the airbag 20 may restrain movement of the occupants 22 toward each other when the seats 16 are rotated in any position relative to each other. The airbag 20 may also restrain the occupant 22 to reduce the likelihood that the occupant 22 is ejected from the seat 16 and/or to reduce the movement of appendages of the occupant 22 during the vehicle impact.

As shown in FIG. 1, the vehicle 24 includes a vehicle body 26 defining the vehicle interior 10. The vehicle body 26 may include the roof 12, the floor 14, and a plurality of pillars (not numbered). The vehicle body 26 may have a uni-body construction, a body-on-frame construction, or any other suitable construction.

With continued reference to FIG. 1, the roof 12 may include a plurality of roof cross-beams 28 and a headliner 30 supported on the roof cross-beams 28, as shown in FIG. 5. The floor 14 may include a plurality of floor cross-beams 32 and a floor panel 34 supported on the floor cross-beams 32. The floor 14 may include upholstery, e.g. carpeting, trim, etc., supported by the floor panel 34.

With continued reference to FIG. 1, the vehicle interior 10 may include one or more seats 16. For example as shown in Figures, the vehicle interior 10 may include a plurality of seats 16 supported by the floor 14. The vehicle 24 may include any suitable number of seats 16, and the seats 16 may be arranged in any suitable arrangement. For example, as shown in the Figures, the seats 16 may be arranged in a front row 38 and a rear row 40. As another example, the seats 16 may be arranged in a ring pattern (not shown). The seat 16 may be, for example, a bucket seat, a bench seat, a child seat, a booster seat, or any other suitable type of seat.

With continued reference to FIG. 1, the seats 16 may each include a seat bottom 36. The seatback 18 may extend upwardly from the seat bottom 36 and may recline relative to the seat bottom 36. A base (not numbered) may support the seat bottom on the floor 14.

The seats 16 may be mounted in a fixed position to the floor 14 as shown in FIG. 1, e.g. fixed to the floor cross-beams 32. Alternatively, the seats 16 may be moveable relative to the floor 14 of the vehicle 24, e.g., in a vehicle fore-and-aft direction and/or a cross-vehicle direction. In other words, the base of the seats 16 may be moveable relative to the floor 14 in the vehicle fore-and-aft direction and/or the cross-vehicle direction.

As set forth above, the seats 16 may be rotatable about the axis A. Specifically, the seats 16 may be rotatable to any selected position about the axis, e.g., 180-360 degrees. The axis A may be perpendicular to the floor, as shown in FIG. 1.

As set forth above, the vehicle interior 10 includes the airbag 20. Specifically, the vehicle interior 10 may include a plurality of airbags 20, as shown in the Figures. The airbags 20 may be mounted to the roof cross-beams 28 and may be disposed between the roof cross-beams 28 and the headliner 30 in the uninflated position, as shown in FIG. 1 and FIG. 5.

The airbags 20 may be formed of any suitable type of material, e.g. from a woven polymer. For example, the airbag 20 may be formed of woven nylon yarn, e.g. nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 20 is a component of an airbag assembly 50. The airbag assembly 50 may include an airbag base 52 supporting the airbag 20. The airbag base 52 may, for example, include clips, panels, etc., for attaching to the airbag 20 and for attaching the airbag assembly 50 to the roof cross-beams 28 or other suitable parts of the roof 12.

Figure 2:
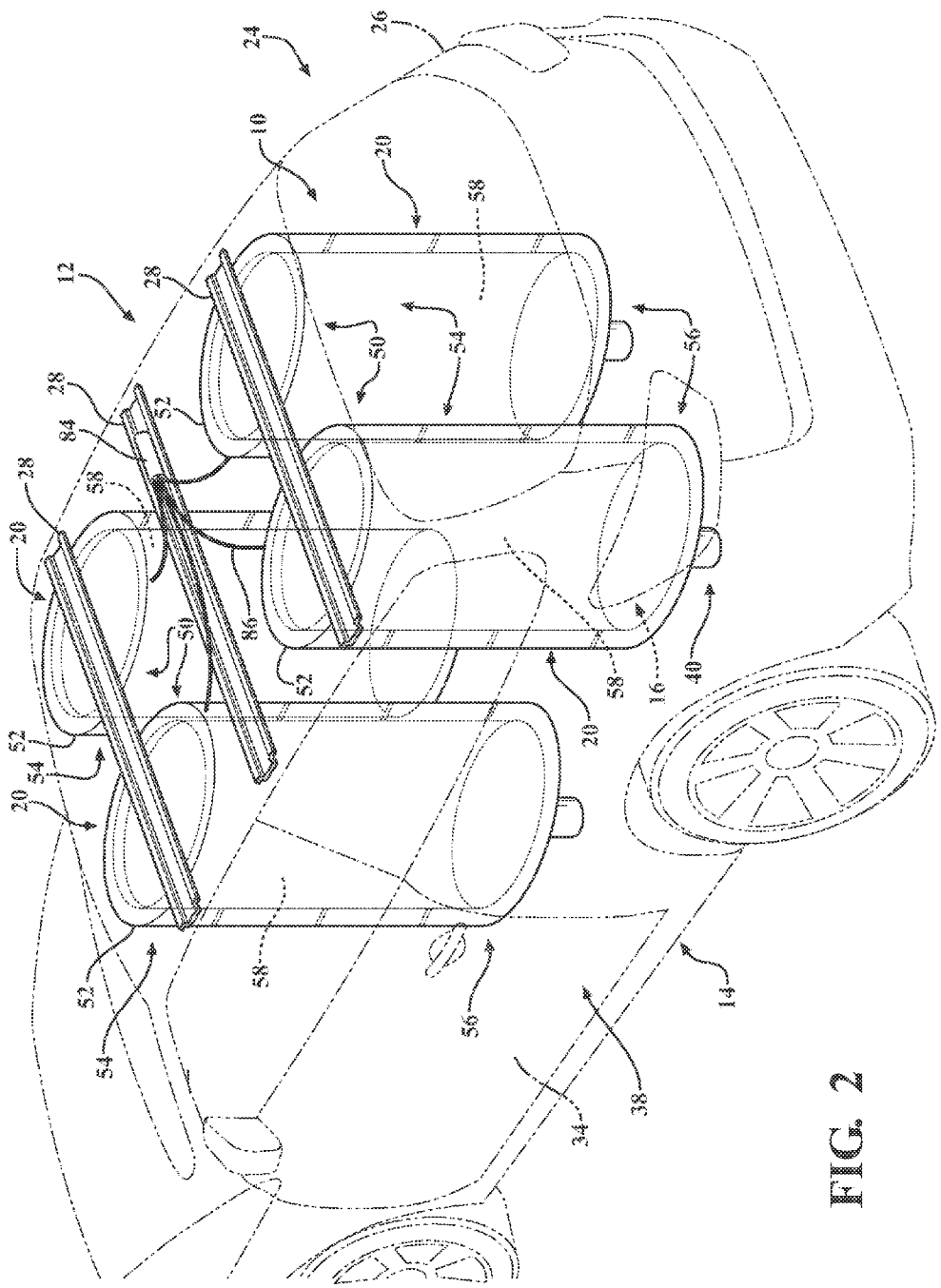
FIG. 2 is the perspective view of FIG. 1 including the airbags in an inflated position.

As shown in FIGS. 2 and 3, the airbag 20 in the inflated position may have a top 54 adjacent the roof 12 and a bottom 56 spaced from the roof 12. A recess 58 may extend from the bottom 56 toward the top 54. The recess 58 may have a symmetrical or asymmetrical shape.

The airbags 20 in the uninflated position, may have a hoop shape, an elliptical shape, etc. As an example shown in FIG. 2, the recess 58 of the airbag 20 in the inflated position may have a tubular shape receiving the seatback 18. The tubular shape may be circular in cross section. Alternatively, the tubular shape may have any suitable cross sectional shape, e.g., oval, rectangular, etc.

The airbag 20 in the inflated position may have a frustum shape. The frustum shape may have a first base 72 adjacent the roof 12 and a second base 74 spaced from the first base 72. The recess 58 may extends through the second base 74. Specifically, an inner panel 64 and/or an outer panel 66 of the airbag 20 may be frustum shaped in the inflated position. A frustum is the portion of a cone (as shown in FIGS. 3-4) or a pyramid that lies between two parallel planes cutting the cone or the pyramid. The second base 74 of the airbag 20 may have a larger perimeter than the first base 72 of the airbag 20.

The recess 58 may have a frustum shape. The recess 58 may have a first base 60 and a second base 62 with the frustum shape of the recess 58 defined between the first base 60 and the second base 62. The second base 62 of the recess 58 may have a larger perimeter than the first base 60 of the recess 58. As shown in FIG. 3, the first base 60 may be adjacent the roof 12 and the second base 62 spaced from the first base 60. Alternatively, the second base 62 of the frustum shape may be adjacent the roof 12 and the first base 60 spaced from the second base 62.

As one example, the frustum shape of the airbag 20 and/or the recess 58 may be an elliptical frustum shape, i.e. the first base 60, 72 and the second base 62, 74 of the elliptical frustum shape may be an ellipse. Alternatively, the first base 60, 72 and the second base 62, 74 of the frustum shape may be rectangular, polygonal or any other suitable shape.

As another example, the frustum shape of the airbag 20 and/or the recess 58 may be a substantially right frustum shape. A right frustum is a parallel truncation of a right pyramid. In other words, considering the right frustum, a line extending from a center of the first base 60, 72 to the center of the second base 62, 74 is perpendicular to both the first base 60, 72 and the second base 62, 74.

As shown in FIG. 3, the inner panel 64 defines the recess 58, and the outer panel 66 which extends circumferentially about the inner panel 64, and an inflation chamber 68 between the outer panel 66 and the inner panel 64. The inflation chamber 68 may taper from the top 54 of the airbag 20 to the bottom 56 of the airbag 20. The taper of the inflation chamber 68 from the top 54 to the bottom 56 may be constructed in various ways, for example a plurality of tethers 70 may be stitched to the airbag 20 engaging the inner panel 64 with the outer panel 66 as shown in FIG. 3. As another example, the size and the space of the inner panel 64 and the outer panel 66 may be designed, e.g., to have the frustum shape, to define the taper of the inflation chamber 68.

With continued reference to FIG. 3, the inner panel 64 may extend across the recess 58 at the top 54 of the airbag 20. This can be constructed in various ways, e.g. the airbag 20 may include an end 76 extending across the recess 58 at the first base 72. The end 76 may be constructed as an inflatable protrusion of the airbag 20 or may be constructed in any other suitable way. An extension of the end 76 across the recess 58 at the top 54 of the airbag 20, may reduce the likelihood of the occupant 22 impacting the roof 12 of the vehicle 24 during the vehicle impact.

Figure 7:
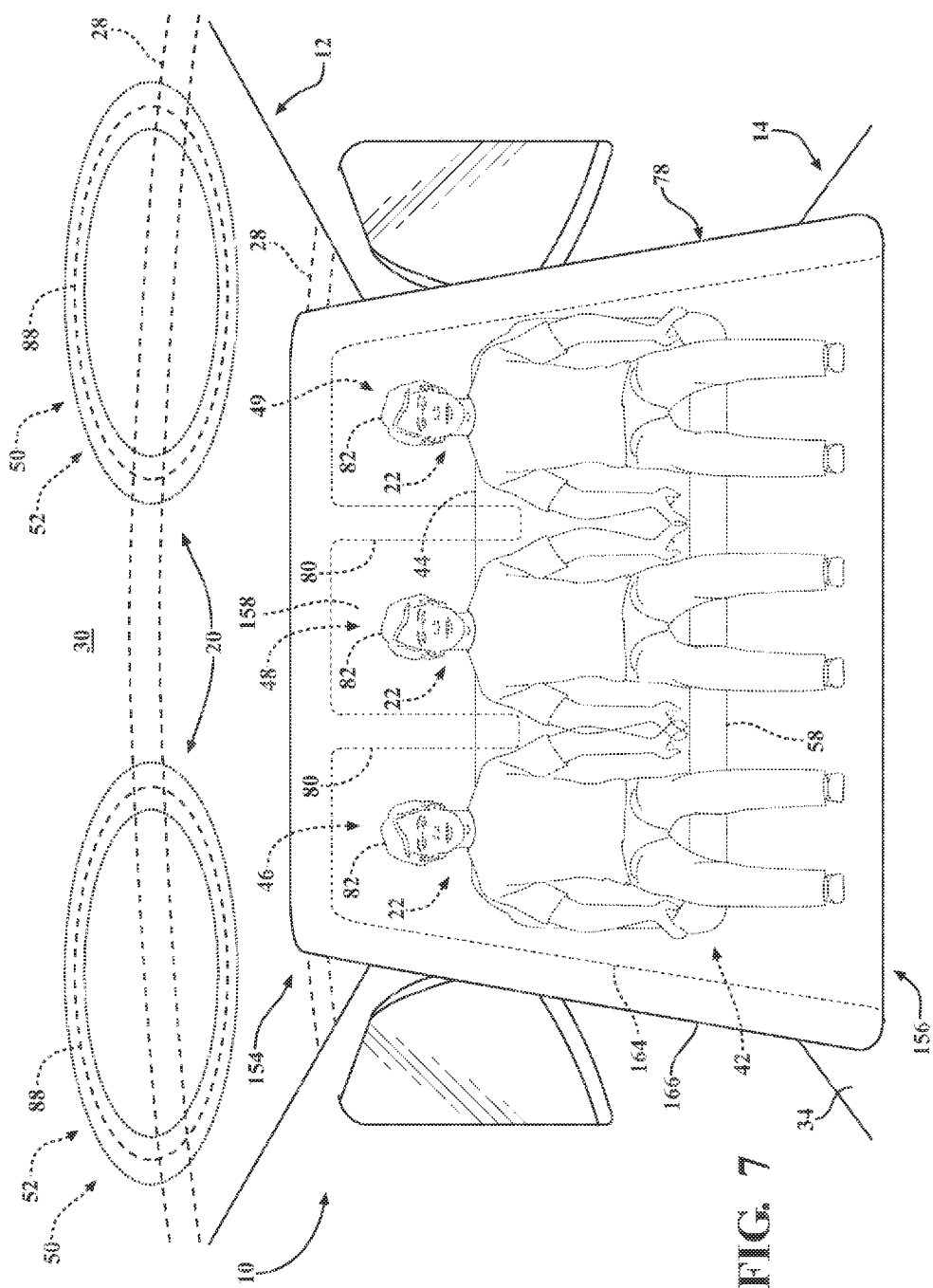
FIG. 7 is the perspective view of FIG. 6 with the airbags in the inflated position.

With reference to FIGS. 6 and 7, the vehicle interior 10 may include a second seat 42 having a second seatback 44. The second seat 42 may include a first passenger portion 46 and a second passenger portion 48. For example, the second seat 42 may be a bench seat. The second seat 42 may have any suitable number of passenger portions, i.e., two or more. For example, as shown in FIGS. 6 and 7, the second seat 42 has three passenger portions, i.e., the first passenger portion 46, the second passenger portion 48, and a third passenger portion 49.

The second seat 42 may be fixed to the floor 14 in the rear row 40. Alternatively, the second seat 42 may be arranged in any other suitable position. The seat 16 may be rotatable relative to the floor 14 about the axis A to a position facing the second seat 42. In addition or alternatively, the second seat 42 may be rotatable relative to the floor 14.

Figure 8:
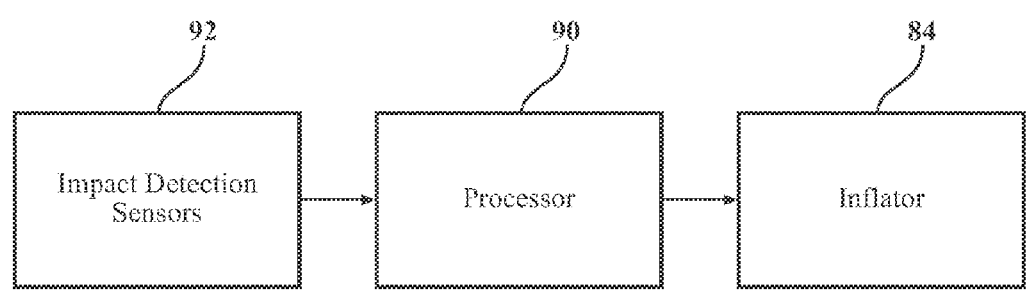
FIG. 8 is a flowchart including a processor, an impact detection sensor, and the inflator.

As shown in FIGS. 6 and 7, the vehicle interior 10 may include a second airbag 78 supported by the roof 12. The second airbag 78 may be inflatable away from the roof 12 from an uninflated position, as shown in FIG. 7, to the inflated position, as shown in FIG. 8. In the inflated position, the second airbag 78 surrounds the second seatback 44. The second airbag 78 may be supported by the roof 12 in the same fashion as the airbag 20. The term "second" in the second seat 42 and the second airbag 78 is merely an identifier and is not intended to indicate order or importance.

With reference to FIG. 7, the second airbag 78 may include a recess 158 receiving the second seatback 44 in the inflated position. The second airbag 78 may include an inner panel 164, an outer panel 166, and an inflation chamber (not numbered) defined between the inner panel 164 and the outer panel 166. The second airbag may include a top 154 adjacent the roof 12 and a bottom 156 adjacent the floor 14. The inner panel 164 may define the recess 158 from the top 154 to the bottom 156. The perimeter of the second airbag 78 in the inflated position may be rectangular, elliptical, or any other suitable shape.

The second airbag 78 may include a divider 80 extending between the first passenger portion 46 and the second passenger portion 48 of the second seat 42. The second airbag 78 may also include another divider 80 extending between the second passenger portion 48 and the third passenger portion 49. The second airbag 78 may include any suitable number of dividers 80 dividing any number of passenger portions of the second seat 42.

The dividers 80 may extend across the recess 158. For example, the dividers 80 may have a first end 96 and a second end 98 (identified in FIG. 6). The first end 96 and the second end 98 may be connected to the inner panel 164. In other words, the first end 96 and the second end 98 may be fixed to the inner panel 164 when the second airbag 78 is inflated. Alternatively, the first end 96 and/or the second end 98 may be disconnected from the inner panel 164.

In the inflated position, the dividers 80 may extend any suitable length from the top 154 toward the bottom 156 of the second airbag 78. The dividers 80 may be positioned to be disposed between heads of potential occupants. For example, as shown in FIG. 7, the dividers may extend from the top 154 to an end (not numbered) spaced from the bottom 156. The end of the dividers 80 may be disposed at shoulder height of potential occupants to reduce the likelihood that heads of occupants collide during a vehicle impact.

The dividers 80 may be in communication with the inflation chamber such that the dividers 80 are inflated together with the inflation chamber. The dividers 80 may be formed of any suitable material, such as the same material as the inner panel 164, and may be attached to the inner panel in any suitable fashion, e.g., stitching.

The vehicle interior 10 may include one or more inflators 84 in fluid communication with the airbags 20, 78 that inflate the airbags 20, 78 from the uninflated position to the inflated position. The vehicle interior 10, for example, may include a single inflator 84 in communication with each of the airbags 20, 78, as shown in FIGS. 1-3 and 6. In this instance, a plurality of fill tubes 86 may connect the inflator 84 to the airbags 20, 78. Alternatively, separate inflators 84 may be in communication with separate ones of the airbags 20, 78.

The inflator 84 expands the airbags 20 with an inflation medium, such as a gas, to move the airbags 20 from the uninflated position to the inflated position. Specifically, the inflator 84 may be in communication with the inflation chamber 68 to supply the inflation medium to the inflation chamber 68. The inflator 84 may be, for example, a pyrotechnic inflator that uses a chemical reaction to drive the inflation medium into the airbag 20. Alternatively, the inflator 84 may be, for example, a cold-gas inflator that, when activated, ignites a pyrotechnic charge that creates an opening for releasing the pressurized inflation medium to the airbag 20 via a fill tube 86. Alternatively, the inflator 84 may be of any suitable type, for example, a hybrid inflator. Alternatively, more than one inflator may be used, e.g. dedicated inflators may be provided for airbags 20 respectively.

The inflator 84 may be disposed in the roof 12, e.g. mounted to the roof cross-beam 28. Alternatively, the inflator 84 may be disposed at any other suitable part of the vehicle body 26, e.g. at the pillars.

As shown in FIG. 2, the inflator 84 may inflate all of the airbags 20 in response to the vehicle impact. Alternatively, the airbags 20 may be inflated selectively. This may be depending on a determination whether the seat 16 is occupied, e.g. by installing an occupancy sensor (not shown) inside the seat 16, or may be depending on physical characteristics of the vehicle impact, e.g. which side of the vehicle 24 impacted, a direction of pressure applied to the vehicle body 26, etc.

As shown in FIG. 5, the headliner 30 may have tear seams 88 adjacent the airbags 20, 78 in the uninflated position. The tear seams 88 may match the shape of the airbags 20, 78, e.g., may be circular, elliptical, etc. Upon inflation of the airbags 20, the airbags 20 may break the headliner 30 at the tear seams 88 and protrude outwardly to the inflated position.

With reference to FIG. 8, the vehicle 24 may include a processor 90 programmed to initiate an inflation of the airbag 20 in response to the vehicle impact. The processor 90 may be embedded in a microcontroller. The microcontroller may include memory, etc. The memory of the microcontroller may store instructions executable by the processor 90 and the processor 90 may read the instructions from the memory and execute the instructions.

Impact detection sensors 92 are adapted to detect the vehicle impact to the vehicle body 24. The impact detection sensors 92 may be disposed in the vehicle body 26 or elsewhere in the vehicle 24. The impact detection sensors 92 may be of various types, e.g. pressure sensor, acceleration sensor, vision sensor, etc. When the vehicle impact occurs, the processor 90 may receive one or more signals from the impact detection sensors 92 indicating the vehicle impact. In response to receiving the signals from the impact detection sensors 92, the processor 90 may initiate the inflation of the airbag 20. Alternatively, the processor 90 may initiate the inflation of the airbags 20 selectively based on information from the impact detection sensors 92 identifying the physical characteristics of the vehicle impact, e.g. which side of the vehicle 24 impacted, amount of pressure applied to the vehicle body 26, etc. and also seat occupancy information, e.g. by using the occupancy sensors disposed inside the seats 16 sensing the occupancy status of the seats 16.

In order to receive the signals from the impact detection sensors 92 and also to initiate the inflation of the airbags 20, the processor 90 communicates with the impact detection sensors 92 and the inflator 84, e.g. through a direct electrical wiring, wherein an analog or a digital signal is transmitted, or through a communication network like CAN (Control Area Network), Ethernet, LIN (Local Interconnect Network) or any other way.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle interior comprising:
a roof;
a floor;
a seat including a seatback and being rotatable relative to the floor about an axis transverse to the floor; and
an airbag supported by the roof and being inflatable away from the roof to an inflated position surrounding the seatback.

2. The vehicle interior according to claim 1, further comprising a second seat including a second seatback, and a second airbag supported by the roof and being inflatable away from the roof to the inflated position surrounding the second seatback.

3. The vehicle interior according to claim 2, wherein the second seat is rotatable relative to the floor about an axis transverse to the floor.

4. The vehicle interior according to claim 2, wherein the seat is rotatable relative to the floor to a position facing the second seat.

5. The vehicle interior according to claim 1, wherein the airbag in the inflated position has a tubular recess receiving the seatback.

6. The vehicle interior according to claim 1, wherein the airbag in the inflated position has a top adjacent to the roof and a bottom spaced from the roof, and the airbag has a recess extending from the bottom toward the top.

7. The vehicle interior according to claim 1, wherein the airbag includes an inner panel defining a recess, the inner panel extending across the recess at the roof.

8. The vehicle interior according to claim 1, further comprising a second seat including a second seatback, and a second airbag supported by the roof and being inflatable away from the roof to an inflated position surrounding the second seatback, wherein the second seat includes a first passenger portion and a second passenger portion, and the second airbag includes a divider extending between the first passenger portion and the second passenger portion.

9. The vehicle interior according to claim 8, wherein the airbag includes a recess receiving the seatback in the inflated position, the divider extending across the recess.

10. A vehicle interior comprising:
a roof;
an airbag supported by the roof and being inflatable away from the roof to an inflated position; and
the airbag in the inflated position having a frustum shape, the frustum shape having a first base adjacent the roof and a second base spaced from the first base with a recess extending through the second base.

11. The vehicle interior according to claim 10, wherein the frustum shape is further defined as an elliptical frustum shape.

12. The vehicle interior according to claim 10, wherein the first base has a perimeter less than the perimeter of the second base.

13. The vehicle interior according to claim 10, wherein the frustum shape is further defined as a substantially right frustum shape.

14. The vehicle interior according to claim 10, wherein the recess has a frustum shape.

15. The vehicle interior according to claim 10, wherein the airbag has an inner panel defining the recess, an outer panel extending circumferentially about the inner panel, and an inflation chamber between the outer panel and the inner panel, the inflation chamber tapering from the first base of the airbag to the second base of the airbag.

16. The vehicle interior according to claim 15, wherein the inner panel and the outer panel are frustum shaped.

17. The vehicle interior according to claim 10, wherein the airbag includes an end extending across the recess at the first base.

18. The vehicle interior according to claim 10, further comprising a seat received by the recess in the inflated position, wherein the seat includes a first passenger portion and a second passenger portion, and the airbag includes a divider extending between the first passenger portion and the second passenger portion.

* * * * *